(12) United States Patent
Kowalski

(10) Patent No.: US 7,330,472 B2
(45) Date of Patent: Feb. 12, 2008

(54) SYSTEM AND METHOD FOR HYBRID COORDINATION IN A WIRELESS LAN

(75) Inventor: John Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1165 days.

(21) Appl. No.: 10/272,641

(22) Filed: Oct. 16, 2002

(65) Prior Publication Data

US 2003/0081583 A1 May 1, 2003

Related U.S. Application Data

(60) Provisional application No. 60/345,863, filed on Oct. 26, 2001.

(51) Int. Cl.
*H04L 12/28* (2006.01)
(52) U.S. Cl. ............... 370/395.21; 370/332; 455/452.2
(58) Field of Classification Search ............ None
See application file for complete search history.

(56) References Cited

U.S. PATENT DOCUMENTS

| | | | |
|---|---|---|---|
| 6,842,460 B1 * | 1/2005 | Olkkonen et al. | 370/465 |
| 6,856,591 B1 * | 2/2005 | Ma et al. | 370/216 |
| 6,865,609 B1 * | 3/2005 | Gubbi et al. | 709/230 |
| 7,110,366 B2 * | 9/2006 | Hulyalkar et al. | 370/252 |
| 2002/0071449 A1 * | 6/2002 | Ho et al. | 370/447 |
| 2002/0093929 A1 | 7/2002 | Mangold et al. | 370/336 |

OTHER PUBLICATIONS

A Short Tutorial on Wireless LANs and IEEE 802.11 by Lough, Blankenship and Krizman (computer.org/students/looking/summer97/ieee802).
Ultra-Wideband Technologies for Short or Medium-Range Wireless Communications (www.intel.org/technology/itj/q22001/articles/art_4g).

* cited by examiner

*Primary Examiner*—Doris H. To
*Assistant Examiner*—Christopher Grey
(74) *Attorney, Agent, or Firm*—Law Office of Gerald Maliszewski; Gerald Maliszewski

(57) ABSTRACT

A system and method are provided for maintaining a hybrid coordinator (HC) in a wireless communications local area network (LAN). The method comprises: a station (STA) seeking a guaranteed quality of service (QoS); establishing a basic service set (BSS) through association with an access point (AP); the AP selecting a HC from STAs in the BSS; the AP broadcasting the HC information to STAs in the BSS; and, the STA initiating a transmission specification (TSPEC) with the HC. In one aspect, selecting an HC from STAs in the first BSS includes integrating the HC function into the AP. Then, a STA seeking a guaranteed quality of service (QoS): receives a broadcast message including a list of potential APs; and, communicates with an AP from the broadcast list. If the STA is unable to communicate with an established AP, then it instantiates a BSS with itself as the AP.

22 Claims, 7 Drawing Sheets

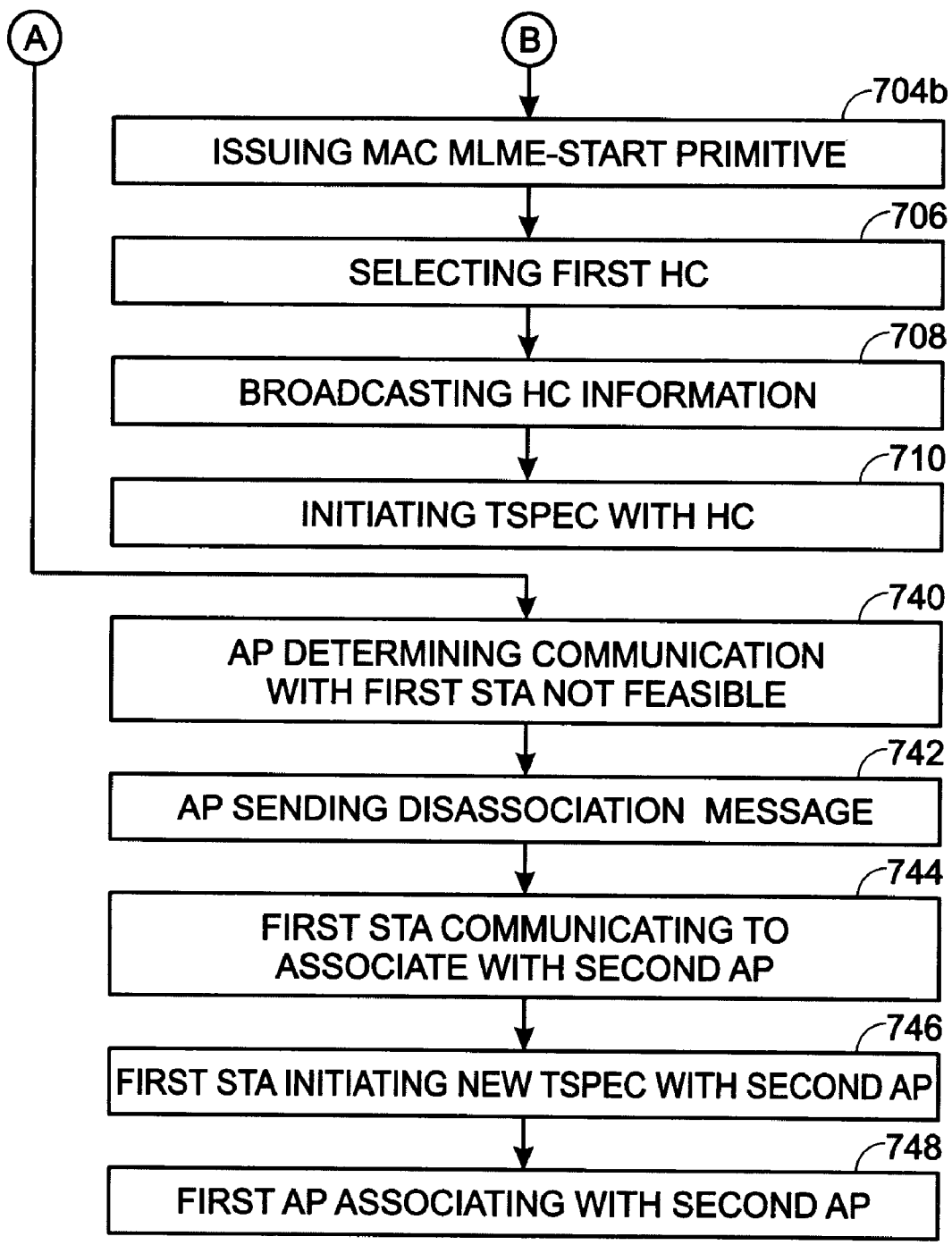

SYSTEM AND METHOD FOR HYBRID COORDINATION IN A WIRELESS LAN

RELATED APPLICATIONS

This application claims the benefit of a provisional application entitled, MEANS FOR ENABLING MOBILITY OF A HYBRID CORRDINATOR FOR 802.11-LIKE WIRELESS LANS, invented by John M. Kowalski, Ser. No. 60/345,863, filed Oct. 26, 2001.

BACKGROUND OF THE INVENTION

1. Field of the Invention

This invention generally relates to wireless local area network (LAN) communications and, more particularly, to a system and method for establishing and/or maintaining a hybrid coordinator (HC) for an IEEE 802.11 wireless LAN.

2. Description of the Related Art

As noted in "A Short Tutorial on Wireless LANs and IEEE 802.11 by Lough, Blankenship and Krizman (computer.org/students/looking/summer97/ieee802), in addition to increased mobility, wireless LANs offer increased flexibility. An "ad hoc" network can be brought up and torn down in a very short time as needed. In IEEE's standard for wireless LANs (IEEE 802.11), there are two different ways to configure a network: ad-hoc and infrastructure. In the ad-hoc network, computers are brought together to form a network "on the fly." There is no structure to the network; there are no fixed points; and usually every node is able to communicate with every other node. Although it seems that order would be difficult to maintain in this type of network, algorithms such as the spokesman election algorithm (SEA) have been designed to "elect" one machine as the base station (master) of the network with the others being slaves. Another algorithm in ad-hoc network architectures uses a broadcast and flooding method to all other nodes to establish who's who. The second type of network structure used in wireless LANs is the infrastructure. This architecture uses fixed network access points with which mobile nodes can communicate. These network access points are sometime connected to landline to widen the LAN's capability by bridging wireless nodes to other wired nodes. If service areas overlap, handoffs can occur. This structure is very similar to the present day cellular networks around the world.

The IEEE 802.11 standard places specifications on the parameters of both the physical (PHY) and medium access control (MAC) layers of the network. The PHY layer, which actually handles the transmission of data between nodes, can use either direct sequence spread spectrum, frequency-hopping spread spectrum, or infrared (IR) pulse position nodulation. IEEE 802.11 makes provisions for data rates of either 1 Mbps or 2 Mbps, and calls for operation in the 2.4-2.4835 GHz frequency band (in the case of spread-spectrum transmission), which is an unlicensed band for industrial, scientific, and medical (ISM) applications, and 300-428,000 OHz for IR transmission.

The MAC layer is a set of protocols that is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor" which determines the amount of time the node must wait until it is allowed to transmit its packet. During periods in which the channel is, clear, the transmitting node decrements its backoff counter. When the channel is busy it does not decrement its backoff counter. When the backoff counter reaches zero, the node transmits the packet. Since the probability that two nodes will choose the same backoff factor is small, collisions between packets are minimized. Collision detection, as is employed in Ethernet, cannot be used for the radio frequency transmissions of IEEE 802.11. The reason for this is that when a node is transmitting it cannot hear any other node in the system which may be transmitting, since its own signal will drown out any others arriving at the node.

Whenever a packet is to be transmitted, the transmitting node first sends out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is necessary to avoid the "hidden node" problem. In the hidden-node situation node A can communicate with node B, and node B can communicate with node C, however, node A cannot communicate node C. Thus, for instance, although node A may sense the channel to be clear, node C may in fact be transmitting to node B. The protocol described above alerts node A that node B is busy, and hence it must wait before transmitting its packet.

As noted in "Ultra-Wideband Technologies for Short or Medium-Range Wireless Communications" (www.intel.org/technology/itj/q22001/articles/art 4g), the most important functions of the MAC layer for a wireless network include controlling channel access, maintaining Quality of Service (QoS), and providing security. Wireless links have characteristics that differ from those of fixed links, such as high packet loss rate bursts of packet loss, packet reordering, and large packet delay and packet delay variation. Furthermore, the wireless link characteristics are not constant and may vary in time and place. The mobility of users poses additional requirements, as the end-to-end path may be changed when users change their point of attachment. Users expect to receive the same QoS after they have changed their point of attachment. This implies that the new end-to-end path should also support the existing QoS (i.e., a reservation on the new path may be required), and problems arise when the new path cannot support the required QoS. Security is obviously an important consideration in wireless networks because, unlike wired networks, the overlaps between networks cannot be controlled. In addition, unauthorized user can also eavesdrop on transmissions. Security is handled through a combination of different means at the MAC layer, and also may include physical layer properties of the network.

In the IEEE 802.11 TGe committee, there is an ongoing project to enhance the 802.11 MAC to provide for prioritized channel access and QoS. The basic channel access function of the 802.11 MAC is the Distributed Coordination Function (DCF), with an optional mode called the Point Coordination Function (PCF) built atop the DCF, which offers a centralized, polling-based communication between stations and a point coordinator. With the PCF, the point coordinator defines a Contention-Free Period (CFP) during which the stations are polled and a Contention Period (CP) during which the normal DFC channel access mechanism holds. A periodic beacon identifies the start of the CFP and the duration. At the current stage, different prioritized channel access mechanisms for an Enhanced DCF (EDCF) mode are being considered. The EDCF mode provides for treating the priorities of different packets (encoded according to 3-bit traffic category tags) by giving them statistically fair access to the medium, is means that packets from the same priority class contend for the medium on equal basis according to the 802.11 MAC rules. Packets from different priority classes contend on a weighted basis, where the higher priority packets get a higher probability of success for channel access. Thus, higher priority classes cannot, in principle, choke transfer of lower priority class traffic under lightly loaded conditions. In addition to the EDCF modes, a type of point coordination function called the Hybrid Coordination Function (HCF) is also being proposed. The HCF mechanism provides for contention-free and controlled-contention transfers during any part of the frame (i.e., CFP or CP) by allowing the Hybrid Coordinator (HC) to generate bursts of CFPs, as opposed to a monolithic CFP. Thus, the HC can essentially create a number of 'mini-CFPs" within the CP, as needed to meet traffic specs. Using this means the HCF promises to provide a flexible scheme where, for example, traffic classes that require periodic transmission opportunities can be accommodated within the CP or the CFP. Traffic that is burstier in nature is handled through the prioritized EDCF mechanism during the CP. In addition, this concept of CFP bursts is expected to mitigate the inter-cell interference that is a problem with the centrally controlled PCF mode when the cells are overlapping in extent.

As noted in US patent application Ser. No. 20020071449 (Ho et al.), a station may transmit by contention-free communications started and controlled by a HC. The HC may be a component of an access point or it may be a separate entity on the network. However, the HC is conventionally considered to be part of the same BSS as the stations that it is controlling. Transmissions during contention-free communications are ensured to be free of collisions because only one station within a given BSS has access to the communications medium at a given time. During contention-free communications either the station containing the HC or the station polled by the HC can transmit at a given time. Once a station has been polled, it is given access to the medium for a specified amount of time and is free to transmit information to any destination for the specified duration.

Alternatively, the station may transmit by contention communications coordinated by the HC. In order to transmit by contention communications, the station must first determine if the medium is idle and its backoff timer must be zero. If either condition is not met, then the station cannot transmit. However, even if both conditions are met, collisions may still occur, since more than one station may have attempted to transmit at the same time. Transmissions by contention communications typically are afflicted with collisions that will require one or more retransmissions after an extended delay.

According to the IEEE 802.11 technical standard, both contention-free and contention communications are supported. Contention-free communications is supported during a contention-free period (CFP) while contention communications is supported during a contention period (CP). Unfortunately for implementing QoS transfers, the CFP is an option in the IEEE 802.11 technical standard. Even if the CFP is provided, it uses a different set of access rules and frame formats than the CP. As a result, there are many IEEE 802.11 compliant wireless local area networks (LANS) that do not offer a contention-free period. In such networks, network latencies are generally large and spectrum utilization efficiencies are generally poor due to contention and collision.

In order to provide "Guaranteed Services" (delivery of packets to meet objectives for rate, delay and jitter) a form of polling is required. Currently, in 802.11e, the only way for polling to be accomplished is through a hybrid coordinator. Such a function is traditionally located in a non-mobile access point that controls a wireless network (called a BSS or basic service set).

In order to realize polling for mobile devices some means of making the hybrid coordinator access point mobile must be realized. This is not only a case of making a device smaller, it has to do with realizing a mechanism for allowing a stream to be maintained (at the application layer) as entities in the network move.

It would be advantageous if a reliable means could be established for providing guaranteed QoS in a wireless LAN.

It would be advantageous if a station (STA) could maintain the same level of QoS as it moves between BSSs.

It would be advantageous if wireless LAN HC could be established and maintained to manage the QoS.

It would be advantageous if guaranteed QoS could be provided for battery operated and portable wireless LAN systems, even if no external infrastructure network is present.

SUMMARY OF THE INVENTION

The present invention provides a means for applications to maintain the registration of streams when mobile stations (STAs) move into and out of BSSs. There is no established mechanism for the maintenance of stream registration of a plurality of stations streams when an access point or hybrid coordinator is no longer available in an 802.11-based BSS. The only mechanisms available are association and dissociation. This invention allows for the concept of a "QoS state" to survive the deinstantiation of a BSS, to provide rapid reestablishment (maintenance) of guaranteed services.

Accordingly, a method is provided for maintaining a hybrid coordinator (HC) in a wireless communications local area network (LAN). The method comprises: a first station (STA) seeking a guaranteed quality of service (QoS); establishing a basic service set (BSS) through association with an access point (AP); the AP selecting a HC from STAs in the BSS, for example, requesting the identity of the HC; the AP broadcasting the HC information to STAs in the BSS, for example, broadcasting the MAC address, support rates, and security capabilities associated with the HC; and, the STA initiating a transmission specification (TSPEC) with the first HC.

In one aspect of the method, when the STA sends a probe message to the AP requesting the identity of the HC, it also sends an indication as to whether it would be eligible to performing the HC task. Selecting a HC from STAs in the BSS either includes the AP sending a response to the STA with the identity of the HC, or if there is no HC, selecting a HC.

This aspect of the method may further comprise: the HC maintaining a QoS table that may include the various STA streams being managed, the STAs receiving QoS, the QoS parameters, and the transmit queue state. If the AP begins to lose communication with the HC, the method further comprises: the AP accepting the QoS table from the HC; the AP selecting a second HC to replace the first HC; the AP sending the QoS table to the second HC; and, following the selection of the second HC, the STA initiating a new TSPEC with the second HC.

In an alternate aspect of the invention, selecting a (first) HC from STAs in the first BSS includes integrating the HC function into the AP. Then, a STA seeking a guaranteed quality of service (QoS): receives a broadcast message including a list of potential APs; and, communicates with an AP from the broadcast list.

If the STA is unable to communicate with an established AP, then establishing a BSS with an AP includes the STA issuing a MAC layer Management Entity START (MLME-STARt) primitive, instantiating a BSS with itself as the AP.

Additional details of the above-described method and a system for maintaining an HC in a wireless communications LAN are provided below.

DETAILED DESCRIPTION OF THE PREFERRED EMBODIMENTS

Figure 1:
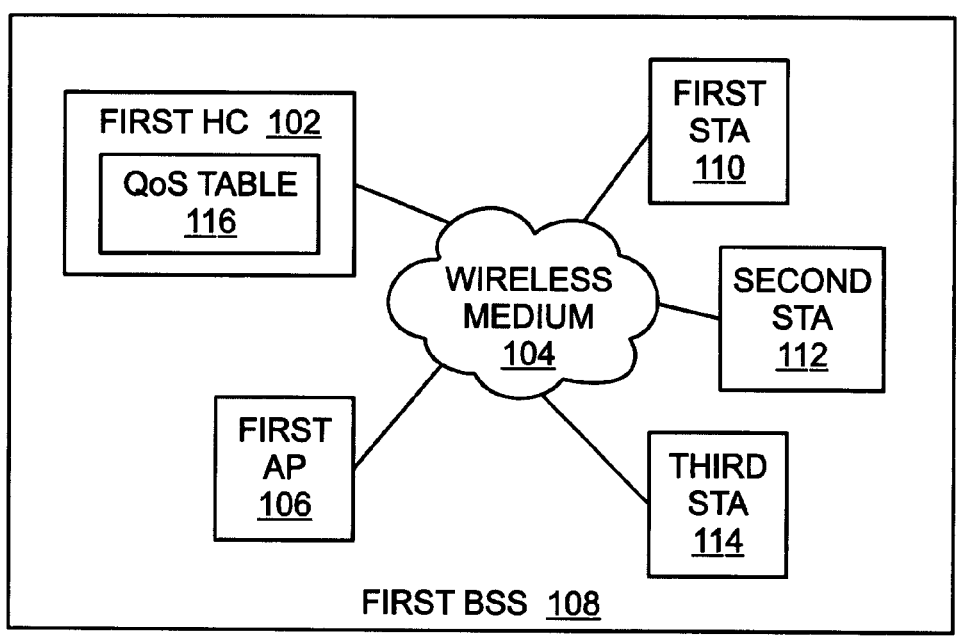
FIG. 1 is a schematic block diagram illustrating the present invention system for maintaining a HC in a wireless communications LAN.

FIG. 1 is a schematic block diagram illustrating the present invention system for maintaining a HC in a wireless communications LAN. The system 100 comprises a first HC 102 having a wireless communications port connected to a wireless medium 104 for managing guaranteed quality of service (QoS) functions. A first access point (AP) 106 selects the first HC 102. In this aspect of the system 100, the HC and AP functions are maintained by different entities. The first AP 106 has a wireless communications port connected to medium 104 to broadcast HC information. A first basic service set (BSS) 108 includes the first AP 106 and the first HC 102. At least a first station (STA) 110 in the first BSS 108 has a wireless communications port connected to medium 104 for requesting a guaranteed quality of service (QoS) from the first AP 106 and for initiating a transmission specification (TSPEC) with the first HC 102. Note that two other STAs are shown, second STA 112 and third STA 114. However, the BSS 108 is not limited to any particular number of STAs.

The first AP 106 broadcasts HC information such as the media access control (MAC) address of the first HC 102 and its capabilities. The HC capabilities include the data rates supported and the security features.

To request a QoS, first STA 110 sends a probe message to the first AP 106 requesting the identity of the first HC 102. In one aspect of the system 100 as shown, the first STA 110 also sends an indication to the first AP 106 as to whether the first STA 110 is eligible to perform the HC task. That is, the first HC 102 can be a STA in the first BSS 108. If a HC already exists, such as the first HC 102, the first AP 106 sends a message to the first STA 110 with the identity of the first HC 102. If there is no first HC, selects a STA in the BSS 108 as the first HC. For example, if the third STA 114 has indicated that it is eligible to perform the HC task, the first AP 106 may select the third STA 114 to be the HC.

The first HC 102 maintains a QoS table 116 that includes information such as the STA streams being managed, as a STA may be communicating with more than one stream, the STAs receiving QoS, the QoS parameters, and the transmit queue state.

Figure 2:
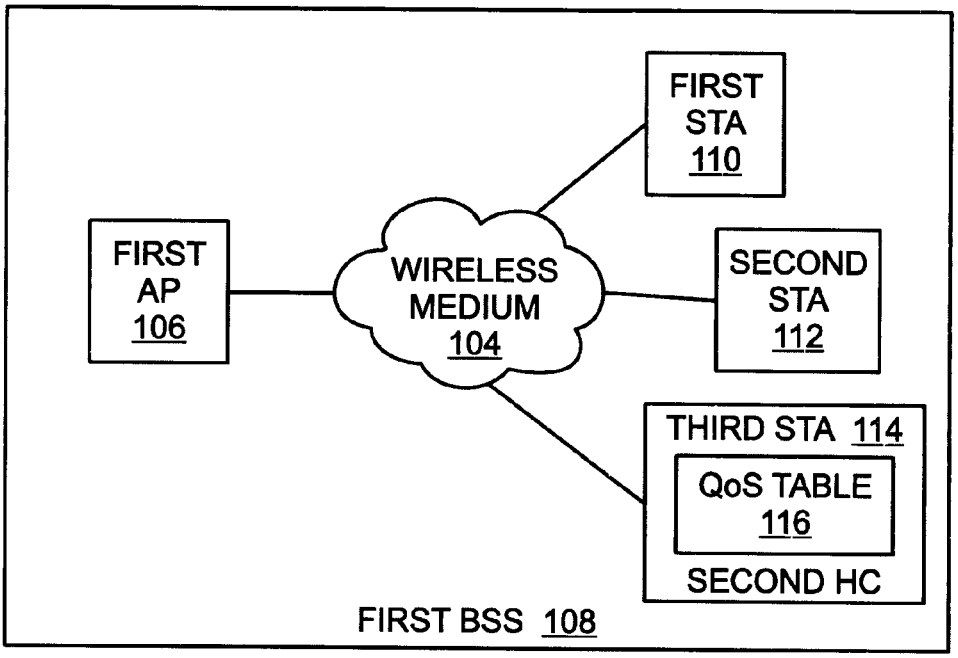
FIG. 2 is a schematic block diagram illustrating the first BSS after the loss of the first HC.

FIG. 2 is a schematic block diagram illustrating the first BSS 108 after the loss of the first HC. When the first AP 106 begins to lose communication with the first HC, for whatever reason, the first AP 106 requests the QoS table 116 from the first HC. Then, the first AP 106 selects a second HC and sends the QoS table 116 to the second HC. As shown, the QoS table 116 now resides with the third STA 114, which has been selected as the second HC. Following the selection of the second HC, in this case the third STA 114, the first STA 110 initiates a new TSPEC with the second HC.

The first AP 106 determines whether it is losing communication with the HC based on considerations such as power levels received by the first AP 106 from the HC, channel quality, and frame error rate, and the ability of the HC to communicate with STAs in the first BSS 108 requesting a QoS.

Considering both FIG. 1 and FIG. 2, in some aspects of the system 100, the first HC 102 sends a message to the first AP 106 announcing the disestablishment of its HC function. Then, the first AP 106 broadcasts the first HC disestablishment announcement to STAs in the first BSS 108 receiving a QoS, and selects a second HC to replace the first HC 102.

The first AP 106 may include a candidate HC list (not shown), and the first AP 106 selects an HC in response to the candidate list. For example, the third STA 114 may have been at the top of the candidate list when it was time to select a new HC. In other aspects of the system 100, a STA, the third STA 114 for example, may make a request to the first AP 106 to become an HC candidate. Then, the first AP 106 selects an HC in response to HC candidate requests. For example, the third STA 114 may have been selected as the HC, in response to a request from the third STA 114.

Figure 3:
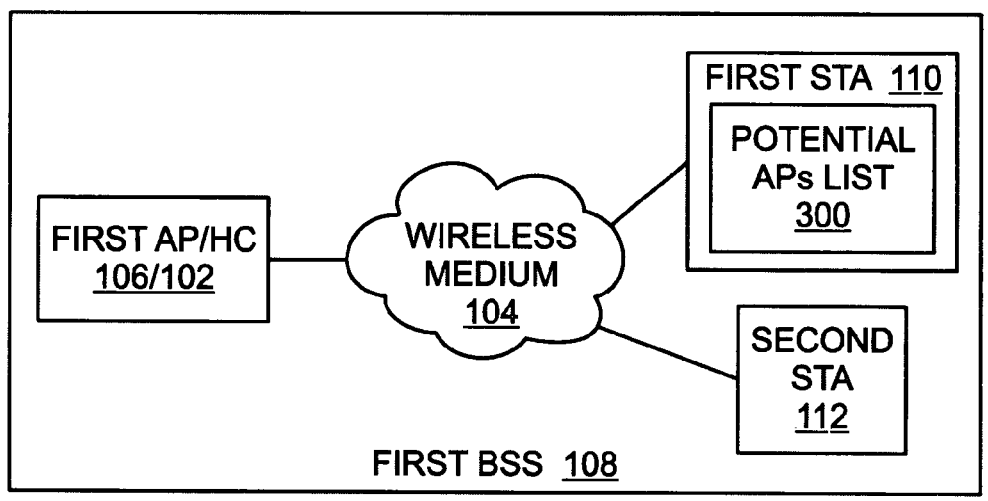
FIG. 3 is a schematic block diagram illustrating the present invention system for maintaining a HC in a wireless communications LAN, where the AP and HC functions are combined in the same entity.

FIG. 3 is a schematic block diagram illustrating the present invention system for maintaining a HC in a wireless communications LAN, where the AP and HC functions are combined in the same entity. This functionality can be understood by considering a change in the AP/HC entity. In FIG. 3, the first HC 102 may send a message to the first AP 106 announcing its separation from the first BSS 108. The first AP 106 broadcasts the first HP separation announcement to STAs in the first BSS 108 receiving a QoS and selects a second HC to replace the first HC. However, it must be understood that the first HC 102 is the first AP 106.

The system 100 can also be understood from the point of view of a STA attempting to initiate a QoS. In one aspect, the first STA 110 receives a broadcast message including a list of potential APs from drivers such as higher level messaging or an installed application. To establish a QoS, the first STA communicates with an AP from the broadcast list. Alternately as shown, the first STA 110 includes a list 300 in memory of potential APs, and the first STA 110 communicates with an AP from the list 300.

Figure 4:
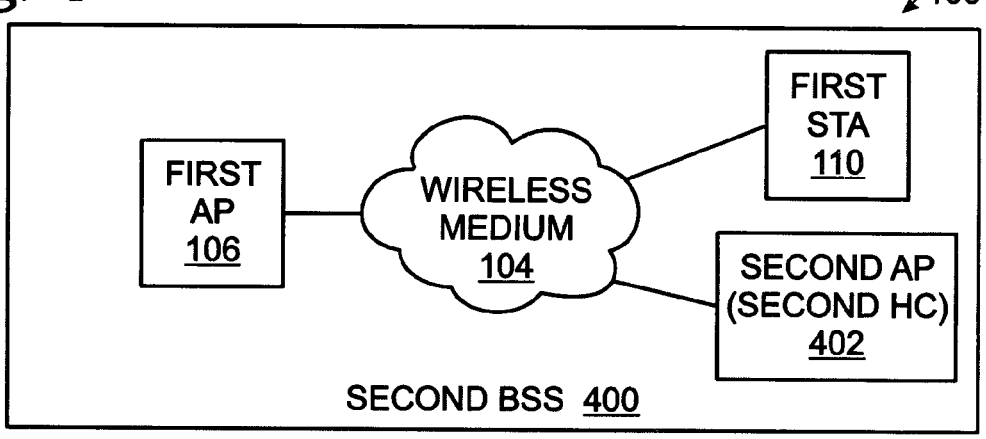
FIG. 4 is a schematic block diagram after the loss of the first AP, assuming that first AP was able to select a new HC.

FIG. 4 is a schematic block diagram after the loss of the first AP, assuming that first AP was able to select a new HC. Considering FIGS. 3 and 4, after the first AP 106 determines that communication with the first STA 110 is no longer feasible, it sends a dissociation message to all STAs in the first BSS 108 receiving a QoS. The system 100 further comprises at least a second BSS 400 with a second AP 402 (where the second AP also functions as a HC). Then, the first STA 110 may communicate to become associated with the second AP 402. If association occurs, the first STA 110 initiates a new TSPEC with the second AP 402. Likewise, the first AP 106 may communicate to become associated as a STA with a second AP 402. Note that when the first AP 106 (currently not performing either an AP or HC task) loses its AP (and HC) functions, the first BSS 108 either ceases to exist, or continues to exist with a different AP (as described below).

Figure 5:
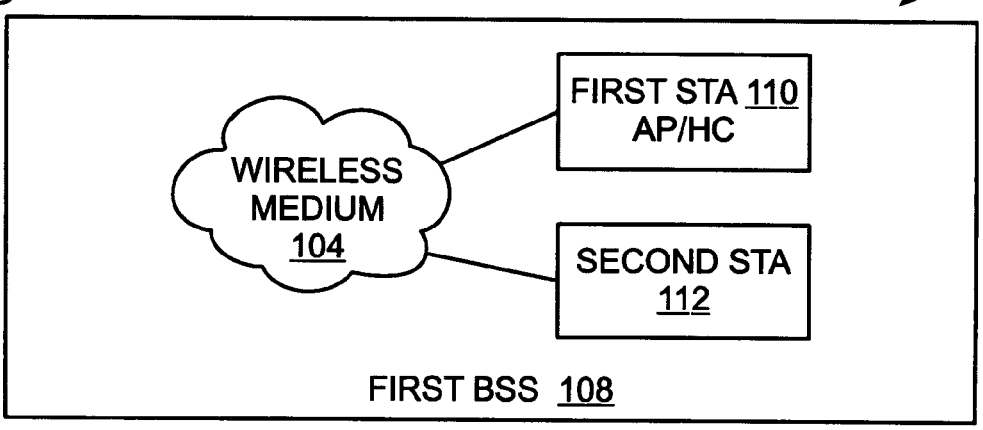
FIG. 5 is a schematic block diagram after the loss of the first AP, assuming that first AP was not able to select a new HC.

FIG. 5 is a schematic block diagram after the loss of the first AP, assuming that first AP was not able to select a new HC. If the first STA 110 is unable to communicate with an established AP, it issues a MAC layer Management Entity START (MLME-STARt) primitive, instantiating the first BSS with itself as the first AP.

Functional Description

Figure 6:
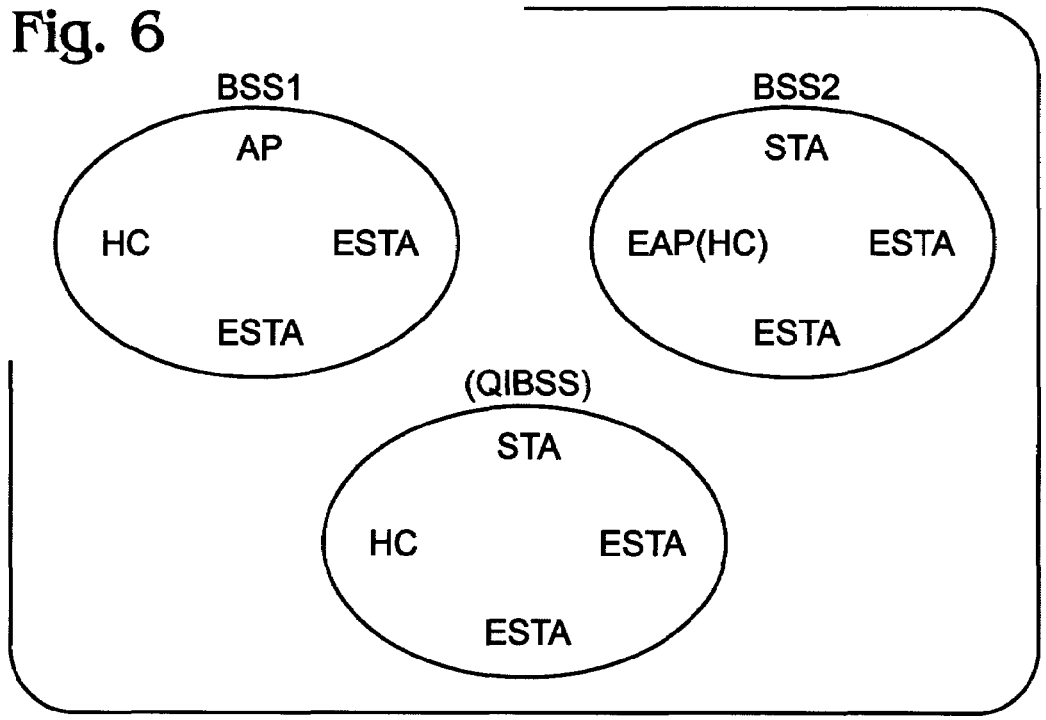
FIG. 6 is a schematic block diagram illustrating several wireless networks.

FIG. 6 is a schematic block diagram illustrating several wireless networks. Network BSS1, for basic service set 1, uses a conventional legacy 802.11 access point. The AP provides access to a HC and two 802.11e-capable enhanced (mobile) stations (ESTAs). BSS2 uses a 802.11e-capable enhanced AP, co-located with an HC. The AP serves a mobile station (STA) and 2 ESTAs. Finally, a QoS enabled independent BSS (QBSS) is shown that provides no access point (meaning no connection to an external network). As used herein, the term (E)AP indicates either an 802.11e-capable EAP or a legacy AP.

One proposed modification to IEEE 802.11e suggests that a hybrid coordinator, responsible for setting polls and managing streams (via queue state transmission), can be separated from an AP. The AP in 802.11 performs the functions of (de)authentication, (dis/re)association, authentication, distribution, integration, privacy, and MAC service data unit (MSDU) delivery.

In separating the HC from the AP, some form of (dis/re) association (called (de/re)registration perhaps) is necessary to determine a relationship between the HC and the other STAs as well as the AP. Some form of MSDU delivery mechanism, namely the hybrid coordination function, is considered as devolved to the HC.

The purpose of this topology is:

1. To allow any station so equipped to be able to perform as a hybrid coordinator when necessary; and, 2. To allow for minimal change to an AP, when it must realize this hybrid coordination function.

The proposed separation is done by a SCAN. A broadcast query is made, "Is there any HC out there?", when a prospective HC wishes to determine whether or not an HC is present in a BSS or Quality of Service Independent Basic Service Set (QBSS).

One proposed signaling method uses passive scanning of a beacon signal sent by the BC and probe/responses directed to the HC. This signaling method works if all STAs and the AP "hear" the HC. However, communication is not guaranteed, because all the stations may not be able to communicate with the HC (there may be a "hidden node").

Assuming that association with an (E)AP, ensures that the (E)AP can communicate with all stations in a BSS, a Request to Send/Clear to Send signaling scheme to the access point would fix the scheme. This signaling scheme is an element of the present invention.

Strictly speaking, in legacy 802.11 direct STA-STA is not allowed. The present invention assumes that an "incremental" change will be made to the standard permitting such behavior. In 802.11e this restriction is relaxed, so this scheme will work for the enhanced access points (EAPs) mentioned above, even if the standard is not modified. In addition, the assumption is made that any decisions that a legacy AP needs to make, in order to effect the establishment and disestablishment protocols, can be done from a higher layer signaling than the MAC.

Thus, the following method is used to establish the hybrid coordinator in a basic service set. The HC maintains a list, in its bandwidth manager (BM), of which streams are being managed, which STAs are being used to support QoS, what their QoS parameters are, and what the latest transmit queue state is. This list is the QoS Table. The QoS Table is transmitted to the (E)AP, as a response to a query from an AP (a "QoS Table Inquiry" message), assuming a QoS enabling Protocol Adaptation Layer is present at a legacy AP.

HC Establishment

1. STA associates with (E)AP (may or may not be enhanced access point);

2. If the STA wishes to be HC, or needs an HC, then:

2.1 The STA makes query to the access point (a "Probe" message, inquiring as to the identity of the access point), and stating whether the STA is eligible for consideration as an HC;

2.2 The STA gets response from (E)AP ("Response") indicating: who, if anyone, is the HC;

2.3 If a new HC is chosen, the AP broadcasts that and relevant addressing information (MAC address, capabilities, etc.) to all members of the BSS;

2.4 The new HC is transmitted the QoS Table from the (E)AP;

3. Stations then renew their registration of streams (if they previously have been granted TSPECs for streams), or initiate new TSFEC negotiation with the new HC, and thereby create a new registration with the HC.

The (E)AP may make the HC determination based on received power level, frame error rate, and other factors indicating channel quality, and by implication, the ability of the HC to communicate with other STAs in the BSS. Those stations that are not the HC, but have requested to become the HC, shall, after meeting certain criteria, be kept in a Candidate HC List maintained by the (E)AP. The (E)AP may select the HC (and Candidate HCs) though a series of directed probes/responses to candidate HCs, as well as by initiation from an HC Candidate, or aspiring STA.

When an HC dissociates, the HC sends the QoS Table to the (E)AP, which transfers it upon request for the next HC that is established (as described above).

HC Disestablishment

1. HC announces its end time to (E)AP via a management frame;
2. AP broadcasts that end time to all STAs;
2.1 If a STA is still in communication with HC, then it may send a dissociate message to the AP and continue stream transmission with the HC as a QBSS;
3. If another STA is in the candidate list, the AP probes the highest candidate on the candidate list to determine if that STA is still HC-capable. If so, the AP broadcasts the new AP, and the procedure of steps 2.3, 2.4, and 3 of the Establishment process (above) are followed.
4. IF another STA wishes to be HC, or needs an HC, then the procedure from step 2 on of the HC Establishment is followed;
5. If there are no STAs that are candidates for HC, or there are no STAs that have requested to become HC, polled QoS service is discontinued, and streams are terminated.

If an HC fails to announce disestablishment to an (E)AP when polled, or fails to supply polls to ESTAs, after a suitable time-out period (a management base information (MIB) parameter), the (E)AP initiates the disestablishment procedure from step 3 onward.

In the above paradigms, stream management requests are made directly to the HC, as per the current 802.11e signaling rules. Thus, if any STA fails to hear the HC, it cannot set up QoS streams.

Finally, for completeness, the case where an HC separates from a BSS, and where an HC joins a BSS is considered.

HC Separating from BSS

1. AP goes into the Disestablishment procedure described above;
2. STAs still in communication with an HC send dissociation messages to AP;
3. BC initiates a beacon transmission—as per legacy 802.11;

An alternative topology is also suggested by the present invention, where the HC is integrated with the AP, permitting queue state and bandwidth management information to survive the termination of a BSS. Any station can associate with, at most, one AP at a time provided it has knowledge of that AP's SSID, and is able to be authenticated. An SSIS is identified with up to a 32-byte tag that labels an extended service set (ESS)—a designation of one or more BSSs associated through an external LAN. BSSIDs, the 48-bit MAC address of an AP, are typically programmed, written, and created by users of a BSS and are entered into the WLAN system via drivers. The following discussion assumes that a QoS Table exists, as described above.

Station Assuming Role of AP/HC

1. Through broadcast messages (originating from above the MAC), BSSID's are broadcast of potential APs. Stations keep a table of potential APs in the event that they are no longer to communicate with the current AP. This may happen because the STA has moved out of range of the AP, for example, when interference becomes great enough, or when a predetermined number of beacons are not detected then;
2. A station wishing to become an AP/HC issues a dissociation message to the AP that it was associated with, and dissociates from the BSS;
3. The station seeking to become an AP/HC s issues a Mac Layer Management Entity START (MLME-STARt.request) primitive, instantiating a BSS with itself as AP.

Coalescing of BSSs

1. An AP that determines (via error rates crossing thresholds for example) that stream communication is no longer feasible sends a dissociation message to all associated STAs;
2. The QoS table is stored;
3. The AP scans for beacons, and attempts association with a QoS BSS;
4. STAs that were previously associated with the "old" AP reassociate with the new AP. The transfer of TSPECs is generally unnecessary.

Thus, the present invention discloses a method for establishing an HC function separate from an (E)AP, a method for disestablishing an HC function separate from an (E)AP, a method for providing the handoff of an HC function to another STA, and a method for permitting QoS-enabled STAs to become APs or to become STAs.

Figure 7:
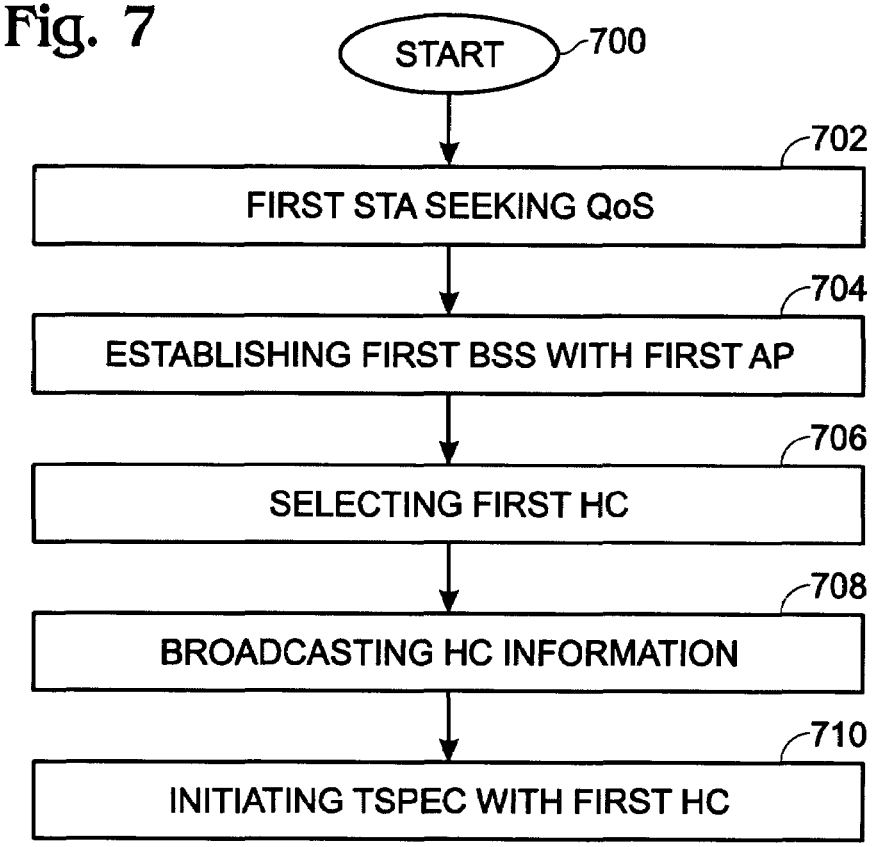
FIG. 7 is a flowchart illustrating the present invention method for maintaining an HC in a wireless communications LAN.

FIG. 7 is a flowchart illustrating the present invention method for maintaining an HC in a wireless communications LAN. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 700.

In Step 702 a first station (STA) seeks a guaranteed quality of service (QoS). Step 704 establishes a first BSS through association with a first AP. In Step 706 the first AP selects a first HC from STAs in the first BSS. In Step 708 the first AP broadcasts the first HC information to STAs in the first BSS. In Step 710 the first STA initiates a transmission specification (TSPEC) with the first HC.

In some aspects of the method, broadcasting the first HC information to STAs in the first BSS in Step 708 includes the first AP broadcasting first HC information such as the media access control (MAC) address or capabilities. In other aspects, a first STA seeking a guaranteed quality of service (QoS) in Step 702 includes the first STA sending a probe message to the first AP requesting the identity of the first HC.

Figure 8A:
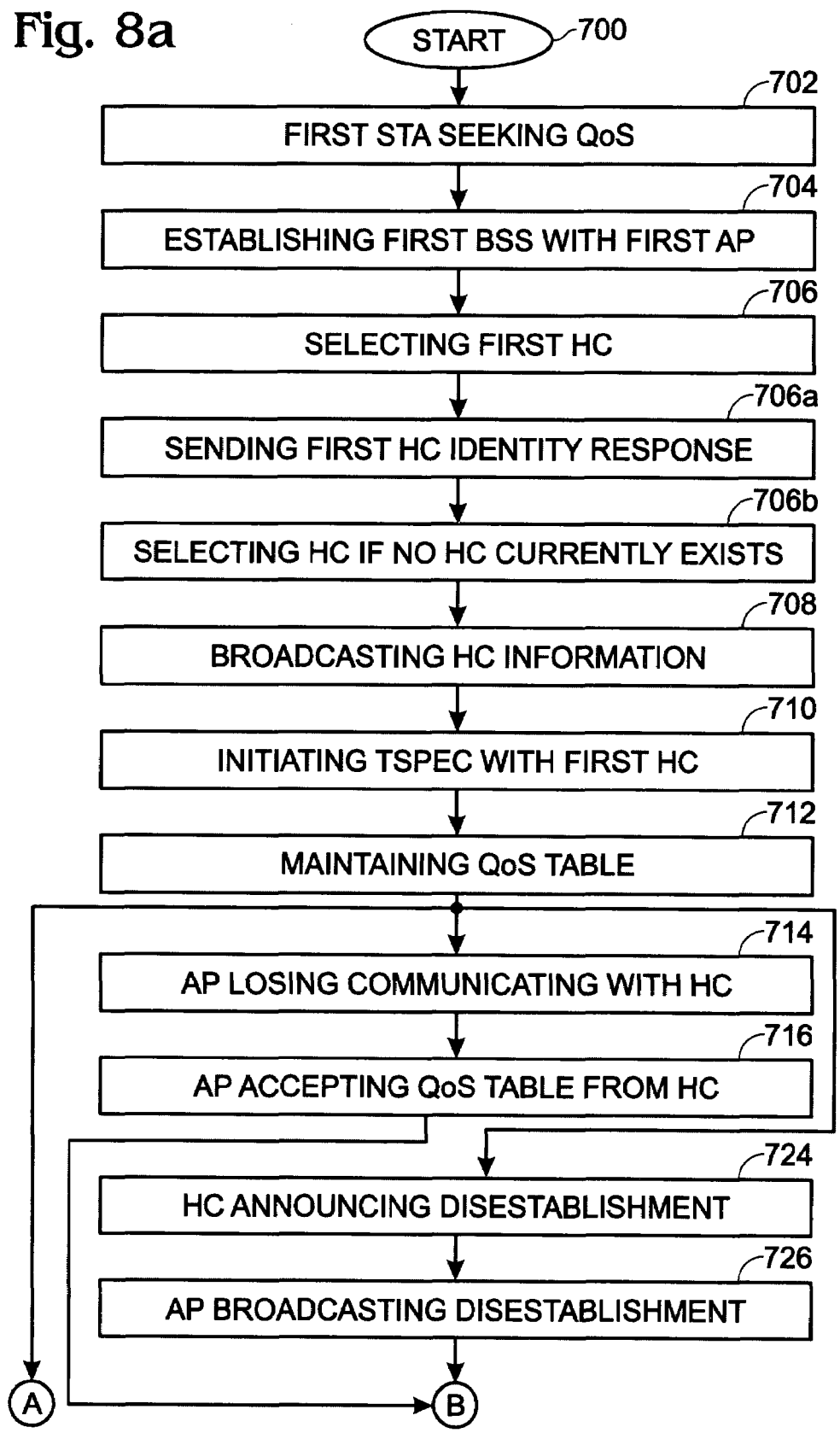
FIG. 8 is the flowchart of FIG. 7 illustrating a first variation of the present invention method.
Figure 8B:
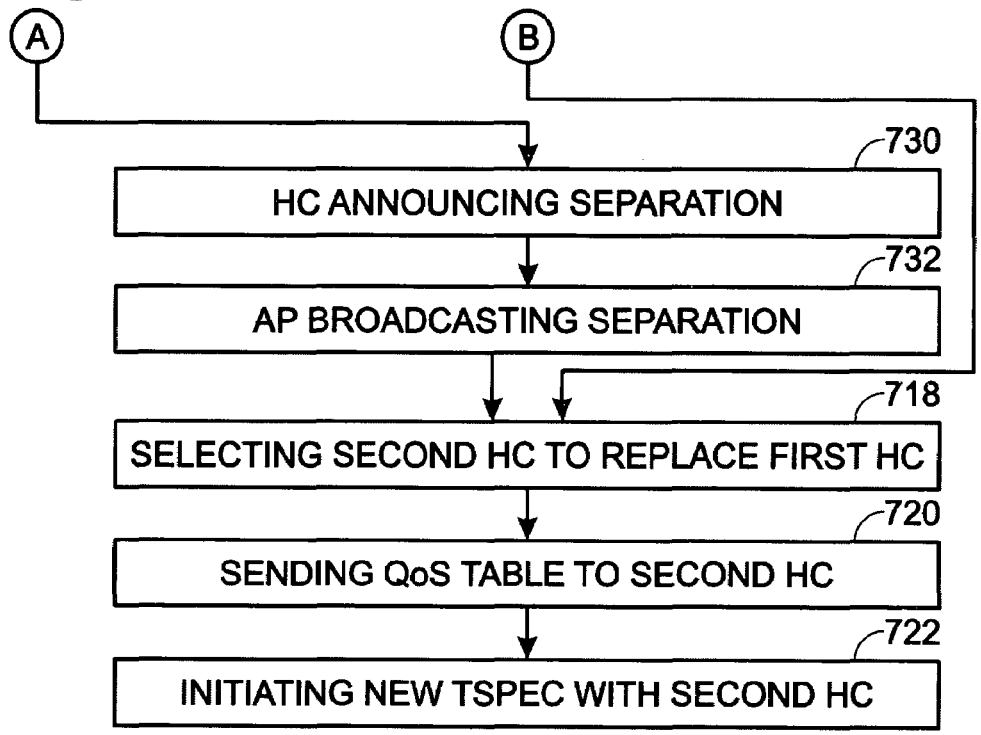

FIG. 8 is the flowchart of FIG. 7 illustrating a first variation of the present invention method. The first STA sending a probe message to the first AP requesting the identity of the first HC in Step 702 includes the first STA communicating its eligibility for performing the HC task.

Then, selecting a first HC from STAs in the first BSS in Step 706 includes substeps. In Step 706*a* the first AP sends a response to the first STA with the identity of the first HC. Step 706*b* selects a first HC if there is no first HC currently existing.

Some aspects of the method include further steps. In Step 712 the first HC maintains a QoS table including information such as the STA streams being managed, the STAs receiving QoS, the QoS parameters, and the transmit queue state. In Step 714 the first AP loses communication with the first HC. That is, the first AP detects a degradation in the quality of communications. In Step 716 the first AP accepts the QoS table from the first HC. In Step 718 the first AP selects a second HC to replace the first HC. In Step 720 the first AP sends the QoS table to the second HC. In Step 722, following the selection of the second HC, the first STA initiates a new TSPEC with the second HC.

In some aspects, losing communication with the first HC in Step 714 includes the first AP making a determination based on AP communication considerations such as received power level, channel quality, and frame error rate, and the ability of the first HC to communicate with STAs requesting a QoS in the first BSS.

In other aspects, selecting a first HC from STAs in the first BSS in Step 706 includes the first AP selecting, either in response to maintaining a candidate HC list, or in response to a request from an HC candidate STA.

As an alternative to Steps 714 through 716, in Step 724 the first HC sends a message to the first AP announcing the disestablishment of its HC function. In Step 726 the first AP broadcasts the first HC disestablishment announcement to STAs in the BSS. Then, in Step 718 the first AP selects a second HC to replace the first HC.

As another alternative to Steps 714 through 716, in Step 730 the first HC sends a message to the first AP announcing its separation from the first BSS. In Step 732 the first AP broadcasts the first HP separation announcement to STAs in the first BSS. Then, in Step 718 the first AP selects a second HC to replace the first HC.

Figure 9A:
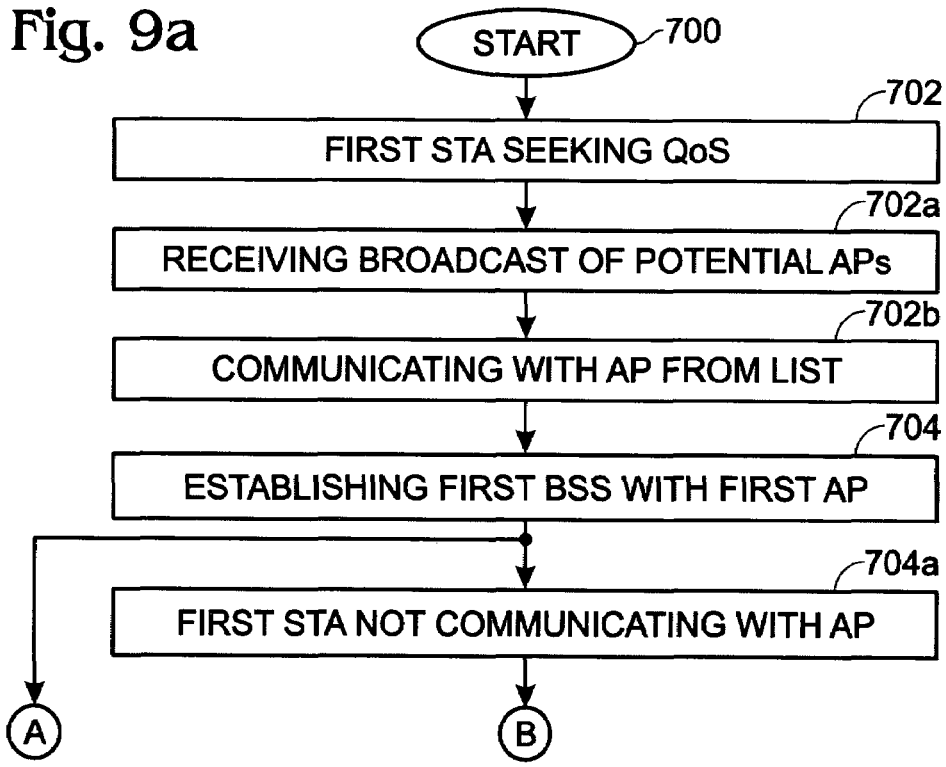
FIG. 9 is a flowchart illustrating another variation of the flowchart depicted in FIG. 7.

FIG. 9 is a flowchart illustrating another variation of the flowchart depicted in FIG. 7. In Step 706, the selection of the first HC includes integrating the HC function into the first AP. Then, a first STA seeking a guaranteed quality of service (QoS) in Step 702 includes substeps. In Step 702a the first STA receives a broadcast message including a list of potential APs. Step 702b communicates with an AP from the list.

In some aspects, establishing a first BSS with a first AP in Step 704 includes substeps. In Step 704a the first STA is unable to communicate with an established AP. In Step 704b the first STA issues a MAC layer Management Entity START (MLME-STARt) primitive, instantiating a first BSS with itself as the first AP.

Alternately, in a Step 740 the first AP determines that communication with the first STA is no longer feasible. In Step 742 the first AP sends a dissociation message to all STAs in the first BSS receiving a QoS. In Step 744 the first STA communicates to become associated with a second AP. In Step 746 the first STA initiates a new TSPEC with the second AP. In some aspects, in Step 748 the first AP communicates to become associated as a STA with a second AP.

Figure 10:
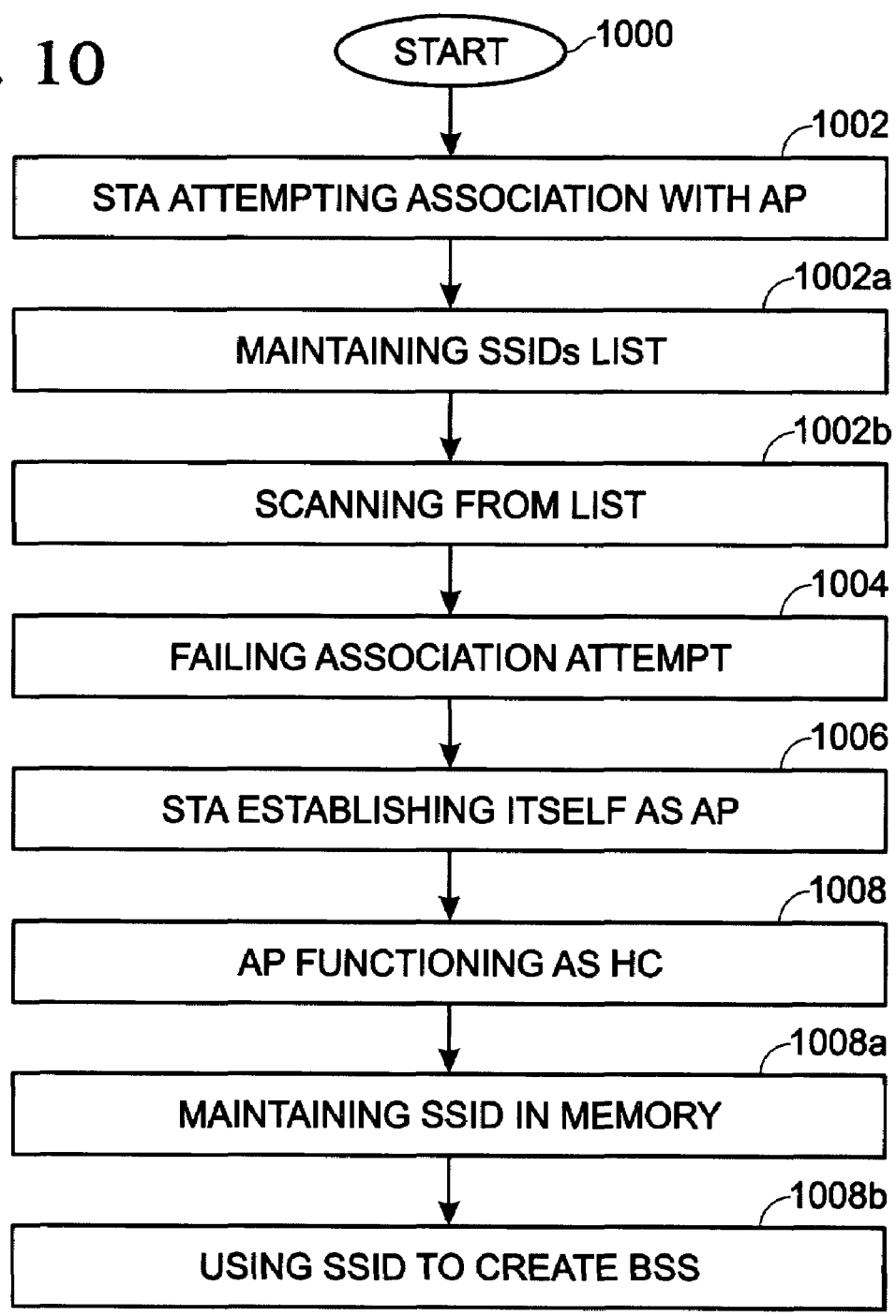
FIG. 10 is a flowchart illustrating another present invention method for establishing an HC in a wireless communications LAN.

FIG. 10 is a flowchart illustrating another present invention method for establishing an HC in a wireless communications LAN. The method starts at Step 1000. In Step 1002 a station (STA) attempts to associate with an AP in a basic service set BSS. Step 1004 fails the association attempt. In Step 1006 the STA establishes itself as an AP. In Step 1008 the AP (the STA that established itself as AP) functions as an HC to perform guaranteed QoS functions. In some aspects, the STA establishing itself as an AP in Step 1006 includes the STA restarting its MAC process as an AP.

In other aspects, a STA attempting to associate with an AP in a BSS in Step 1002 includes substeps. Step 1002a maintains a list of AP service set identifiers (SSIDs). Step 1002b scans to acquire an AP from the list. The STA establishing itself as an AP in Step 1006 includes the STA creating an AP SSID.

In some aspects, the STA establishing itself as an AP in Step 1008 includes substeps. Step 1008a maintains a SSID in memory to uniquely identify a BSS. Step 1008b uses the SSID to create a BSS.

A system and method have been provided for establishing and maintaining an HC in a wireless communications LAN. Although a few examples have been given to illustrate points of the invention, the invention is not limited to merely these examples. Other variations and embodiments of the invention will occur to those skilled in the art.

We claim:

1. A method for maintaining a hybrid coordinator (HG) in a wireless communications local area network (LAN), the method comprising:
   a first station (STA) seeking a guaranteed quality of service (QoS) by sending a probe messages to a first AP requesting the identity of an HC and communicating its eligibility for performing an HC task;
   establishing a first basic service set (BSS) through association with a first access point (AP);
   the first AP selecting the first HC from STAs in the first BSS as follows:
      the first AP sending a response to the first STA with the identity of the first HC; and,
      if there is no first HC, selecting a first HC;
   the first AP broadcasting the first HC information selected from a group consisting of media access control (MAC) address and capabilities, to STAs in the first BBS;
   the first HC maintaining a QoS table including information selected from a group consisting of STA streams being managed, STAs receiving QoS, QoS parameters, and transmit queue state; and,
   the first STA initiating a transmission specification (TSPEC) with the first HC
   wherein the first AP selecting the first HC from STAs in the first BSS includes intergrating the HC function into the first AP
   wherein establishing the first BSS with the first AP includes:
   the first STA being unable to communicate with an established AP; and,
   the first STA issuing a MAC layer Management Entity START (MLME-STARt) primitive, instantiating a first BSS with itself as the first AP.

2. The method of claim 1 further comprising:
   the first AP losing communication with the first HC;
   the first AP accepting the QoS table from the first HC;
   the first AP selecting a second HC to replace the first HC; and,
   the first AP sending the QoS table to the second HC.

3. The method of claim 2 further comprising:
   following the selection of the second HC, the first STA initiating a new TSPEC with the second HC.

4. The method of claim 3 wherein losing communication with the first HC includes the first AP making a determination based on AP communication considerations selected from the group including received power level, channel quality, and frame error rate, and the ability of the first HC to communicate with STAs requesting a QoS in the first BSS.

5. The method of claim 1 wherein selecting a first HC from STAs in the first BSS includes the first AP selecting as follows:
   in response to maintaining a candidate HC list; and,
   in response to a request from an HC candidate STA.

6. The method of claim 1 further comprising:
   the first HC sending a message to the first AP announcing the disestablishment of its HC function;
   the first AP broadcasting the first HC disestablishment announcement to STAs in the BSS; and,
   the first AP selecting a second HC to replace the first HC.

7. The method of claim 1 further comprising:
the first HC sending a message to the first AP announcing its separation from the first BSS;
the first AP broadcasting the first HP separation announcement to STAs in the first BSS; and,
the first AP selecting a second HC to replace the first HC.

8. The method of claim 1 wherein a first STA seeking a guaranteed quality of service (QoS) includes:
the first STA receiving a broadcast message including a list of potential APs; and,
communicating with an AP from the list.

9. The method of claim 1 further comprising:
the first AP determining that communication with the first STA is no longer feasible;
the first AP sending a dissociation message to all STAs in the first BSS receiving a QoS;
the first STA communicating to become associated with a second AP; and,
the first STA initiating a new TSPEC with the second AP.

10. The method of claim 9 further comprising:
the first AP communicating to become associated as a STA with a second AP.

11. A system for maintaining a hybrid coordinator (HC) in a wireless communications local area network (LAN), the system comprising:
a first HC having a wireless communications port for managing guaranteed quality of service (QoS) functions, the first HC maintaining a QoS table including information selected from a group consisting of STA streams being managed, STAs receiving QoS, QoS parameters, and transmit queue state;
a first access point (AP) for selecting the first HC, the first AP including a wireless communications port to broadcast HC information selected from a group consisting of the media access control (MAC) address and capabilities;
a first basic service set (BSS) including the first AP and the first HC;
at least a first station (STA) in the first BSS having a wireless communications port for requesting a guaranteed quality of service (QoS) from the first AP by sending a probe message to the first AP requesting the identity of the first HC, the first STA sending an indication to the first AP as to whether the first STA is eligible to perform the HC task and initiating a transmission specification (TSPEC) with the first HC;
wherein the first HC is a STA in the first BSS: and,
wherein the first AP sends a message to the first STA with the identity of the first HC, and if there is no first HC, selects a STA in the first BSS as the first HC
wherein the first HC is the first AP,
wherein the first STA is unable to communicate with an established AP and issues a MAC layer Management Entity START (MLME-STARt) primitive, instantiating the first BSS with itself as the first AP.

12. The system of claim 11 wherein the first AP requests the QoS table from the first HC in response to losing communication with the first HC, the first AP selecting a second HC and sending the QoS table to the second HC.

13. The system of claim 12 wherein the first STA, following the selection of the second HC, initiates a new TSPEC with the second HC.

14. The system of claim 13 wherein the first AP determines whether it is losing communication with the HC based on considerations selected from the group including AP communication received power levels, channel quality, and frame error rate, and the ability of the first HC to communicate with STAs in the first BSS requesting a QoS.

15. The system of claim 11 wherein the first AP includes a candidate HC list and selects an HC in response to the candidate list.

16. The system of claim 11 wherein the first STA makes a request to the first AP to become an HC candidate; and,
wherein the first AT selects an HC in response to HC candidate requests.

17. The system of claim 11 wherein the first HC sends a message to the first AP announcing the disestablishment of its HC function; and,
wherein the first AP broadcasts the first HC disestablishment announcement to STAs in the first BSS receiving a QoS, and selects a second HC to replace the first HC.

18. The system of claim 11 wherein the first HC sends a message to the first AP announcing its separation from the first BSS; and,
wherein the first AP broadcasts the first HP separation announcement to STAB in the first BSS receiving a QoS and selects a second HC to replace the first HC.

19. The system of claim 11 wherein the first STA receives a broadcast message including a list of potential APs and communicates with an AP from the broadcast list.

20. The system of claim 11 wherein the first STA includes a list of potential APs and communicates with an AP from the broadcast list.

21. The system of claim 11 wherein the first AP determines that communication with the first STA is no longer feasible and sends a dissociation message to all STAs in the first BSS receiving a QoS; and,
the system further comprising:
at least a second BSS with a second AP; and,
wherein the first STA communicates to become associated with the second AP and initiates a new TSPEC with the second AP.

22. The system of claim 21 wherein the first AP communicating to become associated as a STA with a second AP.

* * * * *

UNITED STATES PATENT AND TRADEMARK OFFICE
CERTIFICATE OF CORRECTION

PATENT NO. : 7,330,472 B2
APPLICATION NO. : 10/272641
DATED : February 12, 2008
INVENTOR(S) : John Kowalski It is certified that error appears in the above-identified patent and that said Letters Patent is hereby corrected as shown below:

In col. 12, line 8: In the first line of claim 1, the term "HC" has been incorrectly printed as "HG". The claim should read as follows:

1. A method for maintaining a hybrid coordinator (HC) in a wireless communications local area network (LAN), the method comprising:
    a first station (STA) seeking a guaranteed quality of service (QoS) by sending a probe message to a first AP requesting the identity of an HC and communicating its eligibility for performing an HC task;
    establishing a first basic service set (BSS) through association with a first access point (AP);
    the first AP selecting the first HC from STAs in the first BSS as follows:
        the first AP sending a response to the first STA with the identity of the first HC; and,
        if there is no first HC, selecting a first HC;
    the first AP broadcasting the first HC information selected from a group consisting of media access control (MAC) address and capabilities, to STAs in the first BSS;
    the first HC maintaining a QoS table including information selected from a group consisting of STA streams being managed, STAs receiving QoS, QoS parameters, and transmit queue state;
    the first STA initiating a transmission specification (TSPEC) with the first HC;
    wherein the first AP selecting the first HC from STAs in the first BSS includes integrating the HC function into the first AP;

UNITED STATES PATENT AND TRADEMARK OFFICE
CERTIFICATE OF CORRECTION

PATENT NO. : 7,330,472 B2
APPLICATION NO. : 10/272641
DATED : February 12, 2008
INVENTOR(S) : John Kowalski It is certified that error appears in the above-identified patent and that said Letters Patent is hereby corrected as shown below:

wherein establishing the first BSS with the first AP includes:
          the first STA being unable to communicate with an established AP; and,
          the first STA issuing a MAC layer Management Entity START
(MLME-STARt) primitive, instantiating a first BSS with itself as the first AP.

Signed and Sealed this

Twentieth Day of May, 2008

JON W. DUDAS
*Director of the United States Patent and Trademark Office*